(12) United States Patent
Wienand et al.

(10) Patent No.: US 12,400,773 B2
(45) Date of Patent: Aug. 26, 2025

(54) TEMPERATURE SENSOR AND METHOD FOR PRODUCING A TEMPERATURE SENSOR OF THIS KIND

(71) Applicant: Yageo Nexensos GmbH, Kleinostheim (DE)

(72) Inventors: Karlheinz Wienand, Aschaffenburg (DE); Tim Asmus, Kleinostheim (DE); Christoph Nick, Kleinostheim (DE)

(73) Assignee: Yageo Nexensos GmbH, Kleinostheim (DE)

( * ) Notice: Subject to any disclaimer, the term of this patent is extended or adjusted under 35 U.S.C. 154(b) by 330 days.

(21) Appl. No.: 18/042,534

(22) PCT Filed: Aug. 12, 2021

(86) PCT No.: PCT/EP2021/072514
§ 371 (c)(1),
(2) Date: Feb. 22, 2023

(87) PCT Pub. No.: WO2022/043084
PCT Pub. Date: Mar. 3, 2022

(65) Prior Publication Data
US 2023/0360825 A1    Nov. 9, 2023

(30) Foreign Application Priority Data
Aug. 27, 2020 (EP) .................... 20193018

(51) Int. Cl.
*H01C 1/14* (2006.01)
*G01K 7/16* (2006.01)
*H01C 7/06* (2006.01)
(52) U.S. Cl.
CPC ............ *H01C 1/14* (2013.01); *G01K 7/16* (2013.01); *H01C 7/06* (2013.01); *G01K 2007/163* (2013.01)

(58) Field of Classification Search
CPC ... H01C 1/14; H01C 7/06; G01K 7/16; G01K 2007/163
See application file for complete search history.

(56) References Cited

U.S. PATENT DOCUMENTS 4,333,067 A * 6/1982 Kugimiya .............. H01C 1/142
                                                                338/34
4,791,398 A * 12/1988 Sittler .................... H01C 1/028
                                                                338/308

(Continued)

FOREIGN PATENT DOCUMENTS

CN       104297109 A  *  1/2015  ............. G01N 15/00
CN       110346423 A  * 10/2019  ........... B81B 7/0096

(Continued)

*Primary Examiner* — Laura M Menz
(74) *Attorney, Agent, or Firm* — Dicke, Billig & Czaja, PLLC

(57) ABSTRACT

A temperature sensor comprising:
  a substrate, formed from a metal element, in particular a metal foil, wherein the substrate has a front and a rear side,
  an insulation layer, which covers the front side of the substrate only in some portions, in such a way that an insulation-layer-free portion is formed on the front side of the substrate, and
  a sensor structure, in particular a resistive sensor structure, which is formed on the insulation layer and insulation-layer-free portion of the front side of the substrate,
wherein the sensor structure has at least two electrical contacting portions, and a first contacting portion is connected to the insulation-layer-free portion of the front side of the substrate, and a second contacting portion is a first contact path or is connected to a first contact path, wherein the first contact path is preferably arranged on the insulation layer.

15 Claims, 4 Drawing Sheets

(56) References Cited

U.S. PATENT DOCUMENTS

| | | | | |
|---|---|---|---|---|
| 5,053,740 | A | * 10/1991 | Schultz | G01K 7/18 374/185 |
| 5,896,081 | A | * 4/1999 | Tzeng | H01C 17/006 374/E7.022 |
| 6,085,575 | A | * 7/2000 | Wienand | G01N 27/407 429/495 |
| 6,151,771 | A | * 11/2000 | Tzeng | H01C 17/006 338/195 |
| 7,746,213 | B2 | * 6/2010 | Zitzmann | G01K 7/16 338/25 |
| 9,320,086 | B2 | * 4/2016 | Strehlow | H05B 3/26 |
| 10,529,470 | B2 | * 1/2020 | Loose | H01C 17/075 |
| 11,547,000 | B2 | * 1/2023 | Urfels | H01C 7/003 |
| 11,621,100 | B2 | * 4/2023 | Asmus | C09D 5/24 252/514 |
| 11,673,375 | B2 | * 6/2023 | Dietmann | G01K 1/14 219/544 |
| 12,000,792 | B2 | * 6/2024 | Xiao | G01N 27/128 |
| 12,196,623 | B2 | * 1/2025 | Zinkevich | G01K 1/08 |
| 2006/0225269 | A1 | * 10/2006 | Zitzmann | G01K 7/16 374/E7.018 |
| 2011/0042569 | A1 | * 2/2011 | Cho | G01J 5/20 216/13 |
| 2015/0014301 | A1 | * 1/2015 | Strehlow | H05B 3/26 219/541 |
| 2020/0240848 | A1 | * 7/2020 | Wienand | H01M 10/486 |
| 2020/0240852 | A1 | * 7/2020 | Kostov | G01K 15/005 |
| 2020/0271528 | A1 | * 8/2020 | Wienand | G01F 1/692 |
| 2020/0374985 | A1 | * 11/2020 | Dietmann | A61M 11/042 |
| 2021/0033556 | A1 | * 2/2021 | Muziol | C04B 35/581 |
| 2021/0307178 | A1 | * 9/2021 | Urfels | H01C 1/148 |
| 2022/0013248 | A1 | * 1/2022 | Asmus | H01B 1/22 |
| 2022/0196486 | A1 | * 6/2022 | Zinkevich | G01K 7/18 |
| 2022/0357213 | A1 | * 11/2022 | Neumann | H01L 23/147 |
| 2023/0113930 | A1 | * 4/2023 | Bleifuß | H01C 1/142 374/185 |
| 2023/0318207 | A1 | * 10/2023 | Muziol | H01R 4/023 174/71 R |
| 2023/0328847 | A1 | * 10/2023 | Asmus | A24F 40/46 219/549 |
| 2023/0360825 | A1 | * 11/2023 | Wienand | G01K 7/16 |

FOREIGN PATENT DOCUMENTS

| | | | | |
|---|---|---|---|---|
| CN | 116097072 | A * | 5/2023 | ............ G01K 7/16 |
| DE | 19742236 | C2 * | 10/2000 | ............ G01K 1/14 |
| DE | 102004034185 | B3 * | 1/2006 | ........... G01K 7/186 |
| DE | 102006033856 | B3 * | 2/2008 | ........... G01K 7/186 |
| DE | 102013114295 | A1 * | 1/2015 | ............ G01N 15/00 |
| DE | 202019002164 | U1 * | 8/2019 | ............ G01K 1/08 |
| DE | 102018220169 | A1 * | 5/2020 | ........... G01N 27/223 |
| DE | 202018006417 | U1 * | 7/2020 | |
| EP | 0017359 | A1 | 10/1980 | |
| EP | 437356 | A * | 7/1991 | ............ G01K 7/18 |
| EP | 0437356 | A2 | 7/1991 | |
| EP | 905493 | A1 * | 3/1993 | ............ G01K 1/14 |
| EP | 1692476 | B1 * | 4/2008 | ............ G01K 7/16 |
| EP | 3875424 | A1 * | 9/2021 | ............ B81B 7/0032 |
| EP | 3961170 | A1 * | 3/2022 | ............ G01K 7/16 |
| EP | 3962234 | A1 * | 3/2022 | ............ A24F 40/46 |
| JP | 4356867 | B2 * | 11/2009 | |
| JP | 2013221768 | A * | 10/2013 | |
| JP | 2015-129731 | | 7/2015 | |
| WO | WO-8705146 | A * | 8/1987 | ............ G01K 7/183 |
| WO | 9203711 | A1 | 3/1992 | |
| WO | WO-2005057150 | A1 * | 6/2005 | ............ G01K 7/16 |
| WO | WO-2006007930 | A1 * | 1/2006 | ........... G01K 7/186 |
| WO | WO-2008009347 | A1 * | 1/2008 | ........... G01K 7/186 |
| WO | WO-2020105199 | A1 | 5/2020 | |
| WO | WO-2021032878 | A1 * | 2/2021 | ............ G01B 7/18 |
| WO | WO-2021089460 | A1 * | 5/2021 | ............ G01K 1/143 |
| WO | WO-2022043084 | A1 * | 3/2022 | ............ G01K 7/16 |
| WO | WO-2022229012 | A1 * | 11/2022 | ........... B60L 3/0046 |

\* cited by examiner

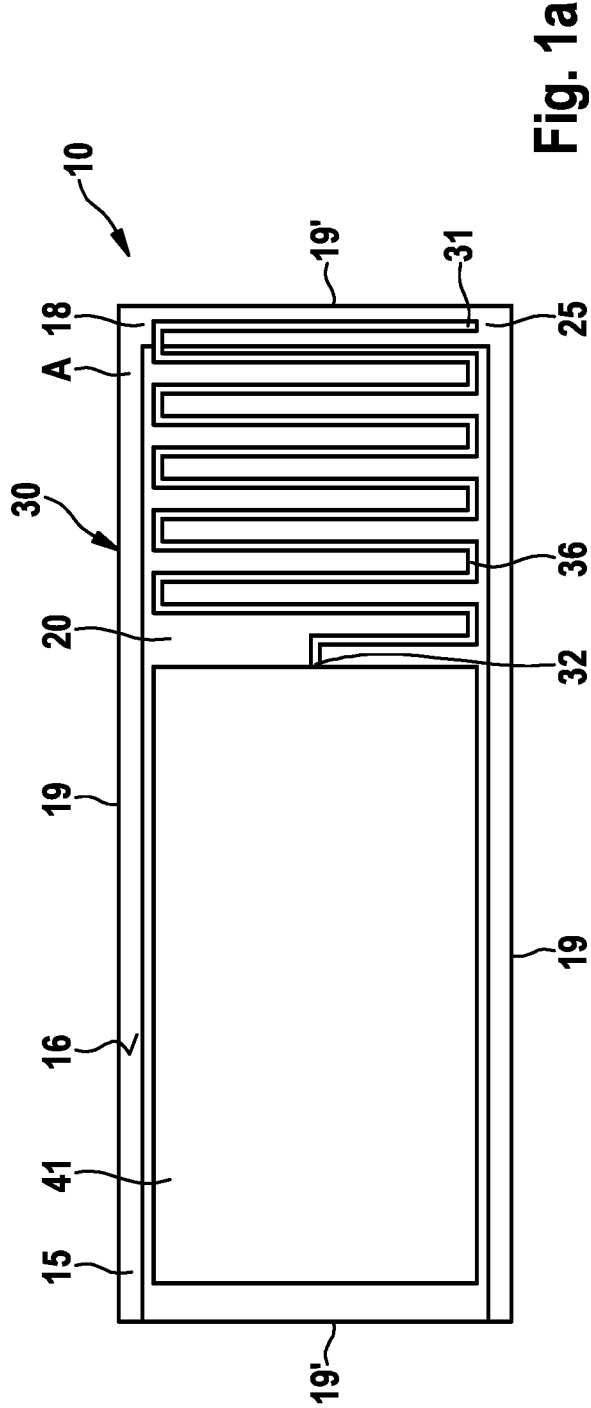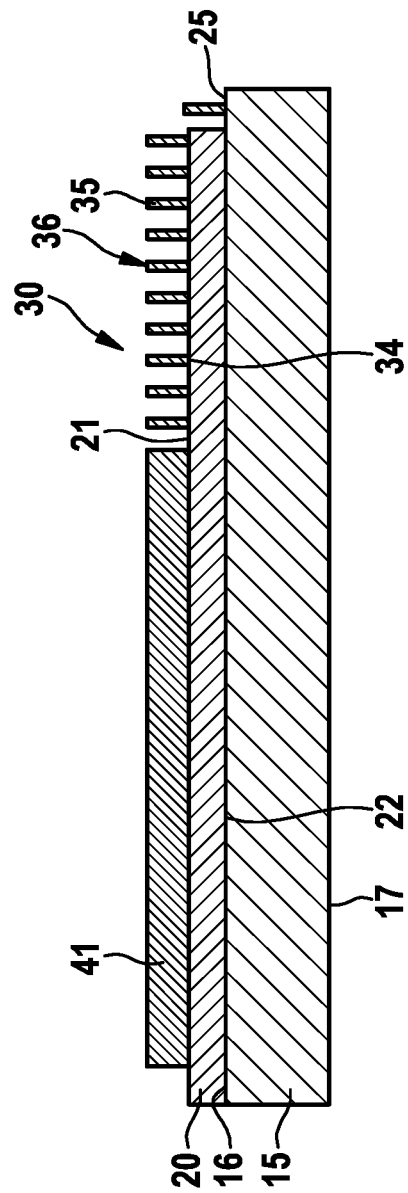

TEMPERATURE SENSOR AND METHOD FOR PRODUCING A TEMPERATURE SENSOR OF THIS KIND

The invention relates to a temperature sensor and to a method for producing a temperature sensor of this kind.

It is known from the prior art to design temperature sensors as small or miniaturized as possible. EP 1 692 476 B1, for example, proposes a temperature sensor based on a platinum thin-film sensor. The contact surfaces of the thin-film sensor are arranged on opposite sides of a substrate. In this case, the sensor structure is contacted with the aid of a so-called feedthrough electrically connecting a first contact pad of the upper side to the metallization on the underside of the substrate. However, the production of such a sensor is relatively complicated. A feedthrough is to be introduced into an insulating substrate, wherein this feedthrough has to be filled with an electrically conductive material.

In U.S. Pat. No. 6,151,771 A, however, an SMD temperature sensor based on a platinum thin-film structure is disclosed. The contacts are guided from an upper side onto an underside of the substrate by metallizing two side surfaces of the substrate. In order to ensure a secure electrical connection between the two contact portions on the upper side and underside of the substrate, additional solder connections are formed which enclose the side surfaces. A disadvantage of such a design of a temperature sensor is in turn the complexity of production. The described side surfaces must be metallized in a working step required for this purpose. Furthermore, forming an additional solder connection is required to enable the connection between the two contacting portions.

Furthermore, it is known to realize small temperature sensors in the form of NTCs. For this purpose, a semiconductor material in the form of a cuboid is provided and metallized on two mutually opposite side surfaces. The metallized side surfaces in turn serve as contacts for the electrical leads. Although this design allows small structural sizes of a temperature sensor, such temperature sensors have the disadvantage of only limited accuracy.

Proceeding from the above, it is an object of the present invention to provide a temperature sensor of this type which, on the one hand, can have small dimensions and on the other hand has a high level of measurement accuracy and is furthermore simple to produce.

A further object of the invention is to specify a method for producing a temperature sensor according to the invention.

According to the invention, this object is achieved with regard to a temperature sensor by the subject matter of claim 1 and with regard to a method for producing a temperature sensor by the subject matter of claim 11.

The invention is based on the concept of specifying a temperature sensor comprising:
 a substrate formed from a metal element, in particular a metal foil, wherein the substrate has a front side and a rear side,
 an insulation layer which covers the front side of the substrate only in portions such that an insulation-layer-free portion is formed on the front side of the substrate, and
 a sensor structure, in particular a resistive sensor structure, which is formed on the insulation layer and on the insulation-layer-free portion of the front side of the substrate,
wherein the sensor structure comprises at least two electrical contacting portions, and a first contacting portion is connected to the insulation-layer-free portion of the front side of the substrate, and a second contacting portion is a first contact pad or is connected to a first contact pad, wherein the first contact pad is preferably arranged on the insulation layer.

A sensor structure is to be understood in particular as a coherent structure. In other words, the sensor structure is preferably formed in one piece.

When the sensor structure is formed as a coherent or one-piece structure, the first and the at least second contacting portion are each formed by a portion of a coherent or one-piece sensor structure.

A sensor structure is understood to mean a coherent structure which does not consist of a plurality of components that are structurally separate from one another.

In particular, the first and the at least second contacting portion are not structurally separate components.

An electrical contacting portion is to be understood in particular as a portion that effects electrical contacting with a further component or another layer.

Preferably, the sensor structure has a meandering structure at least in portions, wherein the at least two contacting portions are different portions of the meandering structure.

According to the invention, the first contacting portion is formed from the portion of the sensor structure which is formed on the insulation-layer-free portion.

In other words, a temperature sensor is specified which has a substrate, an insulation layer and a sensor structure, wherein the insulation layer is applied on a front side of the substrate over less than the entire surface thereof. An insulation-layer-free portion is formed on the substrate. The sensor structure is in turn formed at least in portions on this insulation-layer-free portion. The sensor structure is formed on the insulation-layer-free portion in such a way that at least one contacting portion of the sensor structure is connected, in particular electrically connected, to the insulation-layer-free portion of the front side of the substrate. The underlying object is thus achieved according to the invention in that a sensor structure may be applied to a substrate which can have relatively small dimensions, wherein the electrical contacting is effected on the insulation layer by connection to a contact pad and on the other hand by contacting the substrate due to the formation of the sensor structure on the insulation-layer-free portion.

The first contact pad can be arranged directly or indirectly on the insulation layer or connected to the insulation layer. It is possible for the first contact pad to be indirectly connected to the insulation layer via the second contacting portion.

The front side and the rear side of a substrate are two opposite sides of the substrate. These are the opposite sides of the substrate which are larger in terms of area. The front side and the rear side of a substrate are preferably not to be understood as the sides of the substrate which are formed by the layer thickness or component thickness of the substrate. If both the front side and the rear side consist of the same material or comprise the same coating, both sides can function as the front side and/or the rear side.

In a particularly preferred embodiment of the invention, the substrate is an electrically conductive substrate.

The front side of the substrate is preferably to be understood as the side of the substrate on which an insulation layer is formed directly or indirectly. The insulation layer does not completely cover or incompletely covers the substrate.

In a preferred embodiment of the invention, the insulation-layer-free portion is formed on an edge portion of the front side of the substrate. In particular, a portion of the front side which adjoins at least one side edge of the front side of the substrate is to be understood as an edge portion. Preferably, the edge portion of the front side is the edge portion of the front side which is formed by a shorter side of the substrate.

To make electrical contact with the temperature sensor, the latter comprises supply lines. Preferably, the temperature sensor comprises two electrical supply lines. It is possible for the temperature sensor to comprise a first electrical supply line which is connected to the rear side of the substrate and to comprise at least one second electrical supply line which is connected to the first contact pad. The electrical contacting of the temperature sensor thus takes place on the one hand on the rear side of the substrate and on the other hand on the opposite side of the temperature sensor, namely on the first contact pad. Due to such an electrical contacting, it is possible to provide a temperature sensor with particularly small dimensions. The small dimensions are realized, inter alia, by the fact that the contactings of the temperature sensor are carried out on the opposite sides of the temperature sensor and not, as is usual in the case of sensor structures, next to one another on one side of the temperature sensor or of the substrate.

In a further embodiment of the invention, a passivation layer can be formed at least in portions on the side of the sensor structure facing away from the substrate.

It is possible that the passivation layer is formed from glass frits or comprises glass frits. Furthermore, it is possible that, for example, layers of aluminum oxide ($Al_2O_3$) are formed as passivation layers.

In a further embodiment of the invention, the sensor structure is completely covered with a passivation layer. It is possible for the first contact pad of the temperature sensor to be covered at least in portions by a passivation layer.

Furthermore, it is possible for the first contact pad to be arranged in such a way that it rests in portions on the side of the passivation layer facing away from the sensor structure and is simultaneously electrically connected to the sensor structure. In such an embodiment of the invention, a further reduction of the sensor surface is brought about. Such an embodiment is realized by applying the contact pad at the same time to the passivation layer and the non-covered region of the sensor structure after the application of the passivation layer, for example by screen printing a noble-metal-containing paste.

The metal element, in particular the metal foil, from which a substrate is formed preferably comprises one of the following elements: aluminum (Al) and/or steel, in particular ferritic steel, and/or titanium (Ti) and/or niobium (Nb) and/or tantalum (Ta) and/or nickel (Ni) and/or copper (Cu).

In a particularly preferred embodiment, the metal element, in particular the metal foil, is formed from one of the following elements: aluminum (Al) and/or steel, in particular ferritic steel, and/or titanium (Ti) and/or niobium (Nb) and/or tantalum (Ta) and/or nickel (Ni) and/or copper (Cu).

In particular, it is possible for the metal foil to preferably be formed from materials which form dense metal oxide layers exhibiting a high level electrical insulation during an anionic oxidation. This helps with producing a corresponding insulation layer.

The steel, in particular the ferritic steel, is preferably a FeCrAl alloy, in particular X8CRAl20-5 or FeCr25Al5. When using metal alloys as a component of the substrate, these are preferably to be selected such that their resistance remains as constant as possible over their lifetime. In addition, the resistance of the carrier substrate according to the geometry of the sensor can be taken into account in the case of a possible trimming adjustment of the sensor.

In another embodiment, a roll-plated or laminated metal substrate or a metal sheet with metallic surface coating such as electroplating can be provided.

The substrate preferably has a substrate thickness of 10 µm to 1 mm, in particular of 0.02 mm to 0.5 mm, particularly preferably of 0.05 mm to 0.3 mm. If the substrate is formed from a metal foil with a substrate thickness of less than 300 µm, the substrate has particularly good mechanical flexibility.

Depending on the material selected in connection with the sensor structure, a special selection with regard to the material of the substrate can take place. If, for example, the sensor structure is formed of platinum and/or a platinum alloy, the thermal expansion coefficient of the substrate should be in the range of $6*10^{-6}$ $K^{-1}$ to $15*10^{-6}$ $K^{-1}$. The choice of the material of the substrate with such a coefficient of expansion prevents chipping of a sensor structure applied thereto, which is made of platinum and/or a platinum alloy. If a sensor structure is formed of platinum, ferritic steels or titanium or tantalum are particularly suitable with regard to the substrate material.

Furthermore, it is possible for the substrate to be coated on at least one side, particularly preferably both on the front side and on the rear side, particularly preferably completely, with a nickel protective layer and/or a gold protective layer. Such a nickel protective layer preferably has a thickness of approximately 3 µm. A gold protective layer preferably has a layer thickness of 0.1 µm, in particular of approximately 0.1 µm.

Particularly suitable insulation layers are such electrically insulation layers that electrically separate the electrically conductive substrate from the heating structure. In general, layers exhibiting a specific resistance of >10E10 $\Omega*cm$ are suitable for this purpose.

The insulation layer preferably comprises a metal oxide layer, in particular an anodized metal oxide layer, or a metal nitride layer or a metal oxide nitride layer. In a particularly preferred embodiment of the invention, the insulation layer is a metal oxide layer, in particular an anodized metal oxide layer, or a metal nitride layer or a metal oxide nitride layer.

The advantage of an insulation layer which is or comprises a metal oxide layer, a metal nitride layer or a metal oxide nitride layer is that such insulation layers not only exhibit good insulating properties but can also be designed as thin and mechanically flexibly as possible.

Some metals, such as aluminum or FeCrAl alloys, form particularly stable metal oxide layers so that flaking of the insulation layer or the formation of cracks in the insulation layer is prevented, even in the case of rapid changes in temperature.

Furthermore, it is possible for the insulation layer to comprise the following components or to consist of the following components:
aluminum oxide ($Al_2O_3$) and/or aluminum titanate ($Al_2TiO_5$) and/or titanium dioxide ($TiO_2$) and/or silicon dioxide ($SiO_2$) and/or silicon oxide (SiO) and/or magnesium oxide (MgO) and/or magnesium titanate ($MgTiO_3$) and/or a binary zirconium dioxide alloy and/or a ternary zirconium dioxide alloy and/or boron nitride (BN) and/or aluminum nitride (AlN) and/or silicon nitride ($Si_3N_4$).

In a particularly preferred embodiment of the invention, the insulation layer is produced by means of an aerosol deposition method (ADM). With the aid of such a method, ceramic or glass-like insulation layers can be produced. These layers have a particularly high electrical insulation and can additionally have a thin layer thickness. If the insulation layer is produced by means of the ADM method, the insulation layer thickness can be 0.2 μm-10 μm.

In addition to the ADM, other known deposition methods such as CVD (chemical vapor deposition) or CSD (chemical solution deposition) or PVD (physical vapor deposition) for applying an insulation layer to a metal foil are also possible.

It is possible for the insulation layer to
- be a metal oxide layer, in particular an anodized metal oxide layer or a metal nitride layer or a metal oxynitride layer,
or
- be formed from a layer composite,
or
- comprise a glass-like or glass-ceramic layer formed from a slurry or a paste with metal oxides contained therein, in particular aluminum oxide particles ($Al_2O_3$) and/or magnesium oxide particles (MgO),
or
- be formed from a layer composite, wherein at least one layer has a polymer layer.

It is possible to adapt the selection of the material of the insulation layer to the selection with regard to the material for the metal element, in particular for the metal foil.

The use of a metal foil for producing or providing a substrate, in particular the use of an aluminum foil, has the advantage that a distortion of the metal foil is prevented when the temperature sensor to be produced is applied at higher temperatures.

The use of a metal foil for forming an electrically conductive substrate furthermore has the advantage that in contrast to the use of polymer substrates, for example, the insulation layer can be applied by means of variable methods.

Because the metal foil can be exposed to high temperatures, the insulation layer can also be applied by means of such methods which are accompanied by a high temperature loading. This is the case, for example, when applying pastes containing metal. Such pastes or sinter paste layers normally need to be sintered at high temperatures of, for example, 1,000° C. Since a metal foil is used, such temperature exposures can readily be provided.

An anodized metal oxide layer differs from an atmospheric metal oxide layer in having a higher electrical insulation. An anodized metal oxide layer can be produced, for example, by anodizing a metal surface. In other words, an insulation layer which is an anodized metal oxide layer can be produced by anodizing the metal surface of the substrate. Due to electrolytic oxidation, the surface of the metal foil is converted into a metal oxide layer.

An anodizing method is a method in surface technology for producing an oxidic protective layer by anodic oxidation. In contrast to galvanic coating methods, the protective layer is not deposited on the workpiece, but instead an oxide or hydroxide is formed by converting the uppermost metal layer. A layer of 5 μm-25 μm is produced, which protects and isolates underlying layers or elements, namely the substrate.

A further possibility for producing a metal oxide layer is a hard anodizing method. Here, the metal foil is immersed in an electrolyte as in the case of the eloxal method and is connected as an anode. The surface of the metal foil is thereby oxidized so that a metal oxide layer forms. In this case, a volume increase in the metal foil takes place.

Appropriate selection of the material of the electrically conductive substrate enables a corresponding selection with regard to the insulation layer to be formed thereon.

When a steel foil made of a FeCrAl alloy is used, oxidation of this layer in air at an elevated temperature can also produce a metal oxide layer.

When a FeCrAl alloy with an aluminum content of 6% is used, for example, an electrically insulating insulation layer, in particular an electrically insulating aluminum oxide layer of up to 5 μm can be produced in an oxygen-containing atmosphere in an oven at oxidation temperatures of 1,000° C. to 1,100° C.

In a further embodiment of the invention, it is also possible for steel materials with a low CrAl content to be used, provided such a steel foil is alitized on at least one surface or on at least one surface. An alitizing method involves an aluminum-containing layer being applied to the substrate metal foil, wherein this aluminum-containing layer is subsequently annealed at temperatures of 800° C. to 1,200° C. This produces dense $Al_2O_3$ layers with a thickness of >20 μm. The $Al_2O_3$ layer is present in the α-phase. On the basis of this method, an insulation layer is formed on at least one side of the substrate. Such an insulation layer is an electrically insulating metal oxide layer.

The insulation layer can also be produced from a glass-like connection. For this purpose, glass slurries which contain various finely ground metal oxides, in particular aluminum oxide particles and/or magnesium oxide particles and/or titanium oxide particles, are used.

It is also possible for the insulation layer to be formed from a layer composite. In other words, the insulation layer can have a multi-layer structure. Such a layer composite or a multi-layer structure has the advantage that pinholes or other disturbances and/or defects in a first layer of the layer composite are covered by the application of further layers, and because of this the short-circuit probability between the sensor structure and the conductive substrate decreases.

If the temperature sensor according to the invention is to be used at temperatures of less than 260° C., the layer composite can also compromise the combination of inorganic layers with polymer layers. If the insulation layer is formed from a layer composite having a polymer layer, polymer layers can be formed, in particular, which comprise materials that can be separated from solution. For example, the polymer layer is a layer made of polyimide and/or Teflon and/or polycarbonate.

In a particularly preferred embodiment of the invention, the layer composite can be formed from three layers. A first layer is an aluminum oxide ($Al_2O_3$) layer. This layer is preferably produced by means of an ADM. The second layer may be a polyimide layer. The third layer is preferably in turn an aluminum oxide ($Al_2O_3$) layer, which is particularly preferably produced by means of ADM. Such a layered composite provides a particularly short-circuit-resistant insulation layer.

Irrespective of the embodiment of the insulation layer, the insulation layer covers the substrate, in particular the electrically conductive substrate, only in portions. In other words, the substrate, in particular the electrically conductive substrate, is not covered with the insulation layer in at least one portion and is thus electrically contactable in this insulation-layer-free portion.

In a further embodiment of the invention, it is possible for the temperature sensor to comprise a second contact pad which is in particular formed on the insulation layer. The second contact pad is preferably electronically connected to the first contact pad, wherein the second contact pad preferably forms a further tap of a resistor network.

The first contact pad and/or the second contact pad forms/form the connection of the sensor structure to a contacting portion of the sensor structure, in particular to the second contacting portion of the sensor structure. If the temperature sensor according to the invention has a complex resistor network, it is necessary to form more than two contact pads on the side of the sensor structure. The contact pads serve as a contacting portion both for electrical leads and for corresponding taps.

In one embodiment of the invention, two contact pads bridged with one another can be formed so that the contribution of the electrical supply line to the total resistance of the sensor structure can be detected.

The first contact pad and/or the second contact pad can be a bonding pad, for example. The at least one contact pad preferably comprises or consists of such a sinterable material. The sinterable material can contain or consist of metal. The metal can preferably be selected from the group consisting of precious metals or non-precious metals.

Precious metals can be selected from the group consisting of gold, silver, platinum, palladium, or iridium.

Non-precious metals can be selected from the group consisting of aluminum, copper or nickel.

The metal can have or consist of an elemental metal or an alloy.

In a preferred embodiment, the metal is an alloy. The alloy can contain a precious metal selected from the group consisting of gold, silver, platinum, palladium, or iridium. The alloy preferably contains two or more precious metals. For example, the alloy can be a silver alloy or a silver-platinum alloy. In another embodiment, the alloy can comprise at least one precious metal and at least one non-precious metal. The alloy may optionally have both precious metal and non-precious metal. Furthermore, it is possible for the alloy to comprise non-metals.

The area of the at least one contact pad is not further limited according to the invention. In a preferred embodiment, the first contact pad and/or the second contact pad has a dimension of no more than 1 mm, in particular no more than 200 µm, and very particularly preferably no more than 50 µm, in a first direction which runs in particular in parallel with the substrate surface.

In a further embodiment, the first contact pad and/or the second contact pad has a dimension of no more than 300 µm, in particular no more than 100 µm, in particular no more than 5 mm, and very particularly preferably no more than 50 µm, in a second direction perpendicular to the first direction which preferably also runs in parallel with the substrate surface.

The shape of the first contact pad and/or the second contact pad is not further limited. For example, the first contact pad and/or the second contact pad can be round or angular, in particular rectangular.

The sensor structure, in particular the resistive sensor structure, can be formed in particular from a metal. Preferably, the sensor structure, in particular the resistive sensor structure, can consist of a pure metal or a metal alloy. In particular, the sensor structure has a metal or a metal alloy which has a temperature coefficient >3E-3/K.

In a particularly preferred embodiment of the invention, the sensor structure comprises platinum and/or aluminum and/or nickel. In a particularly preferred embodiment of the invention, the sensor structure, in particular the resistive sensor structure, is formed of platinum and/or a platinum alloy. The at least one sensor structure is preferably applied directly to the insulation layer in portions. In other words, the one sensor structure is applied, at least in portions, directly to the side of the insulation layer facing away from the substrate. In such an embodiment of the invention, no further layers are formed between the sensor structure and the side of the insulation layer facing away from the substrate.

However, embodiments are also possible in which adhesion promoter layers, such as titanium/titanium oxide or tantalum/tantalum oxide layers or titanium nitride, are formed between the insulation layer and the sensor structure.

The sensor structure describes an element structured in this way which is preferably made of metal that actually detects the temperature.

The sensor structure, which is produced in particular from a metal structure, can comprise any shape. For example, forming a sensor structure in a square shape is possible. Forming a sensor structure with a substantially straight-line structure is also possible.

In particular, the sensor structure has a meandering shape. Such a meandering shape can be formed, for example, from a continuous, interwoven and/or nested and/or intermeshed line structure. The individual portions, in particular the individual line portions, can be made relatively thin.

The sensor structure, which is present in particular in a meandering shape, may cover an area of any desired size due to the structure formed. This enables rapid detection of the temperature to be detected.

The sensor structure can be formed from a structured metal foil. If such a design is present as regards the sensor structure, the sensor structure may be produced in a separate process and subsequently applied to the insulation layer.

Furthermore, it is possible for the sensor structure to be produced from a paste containing metal and/or an ink containing metal. Such a paste and/or ink containing metal can be applied to the insulation layer and on the insulation-layer-free portion of the front side of the substrate in the context of printing, in particular in the context of a screen printing method.

In a particularly preferred embodiment of the invention, the sensor structure is produced from a paste containing a noble metal. In particular, the noble metals may be platinum and/or silver and/or gold.

In a further embodiment of the invention, the sensor structure is a metal structure produced by means of thin-foil metal deposition.

Due to the embodiment of the temperature sensor according to the invention having the layers designed according to the invention and the arrangement of the sensor structure, an improved temperature sensor in comparison to the prior art with a reduced area can be provided.

The area of the temperature sensor is preferably less than 10 mm$^2$, particularly preferably less than 3 mm$^2$, particularly preferably less than 2 mm$^2$, very particularly preferably less than 1 mm$^2$. The area of the temperature sensor can be seen in particular in a plan view of the temperature sensor.

In a further embodiment of the invention, the sensor structure can have a trimming path. The trimming path serves to adjust a preferred resistance setpoint of the sensor structure.

In a further embodiment of the invention, it is possible for a three-dimensional sensor structure to be arranged on the substrate. A three-dimensional sensor structure is understood to mean a sensor structure which has at least two metal layers at least partially spaced apart from one another. Between the metal layers, an insulation layer is formed at least in portions. In addition, the two metal layers touch at least in portions. Preferably, the at least two metal layers touch in a region of the first contacting portion.

With the aid of the temperature sensor according to the invention, a temperature sensor is provided which is distinguished by high level of accuracy with a very small overall size. Due to the small design of the temperature sensor, the temperature sensor mass is also reduced so that the response time of the temperature sensor is correspondingly reduced. In other words, the temperature sensor responds faster to temperature changes.

The advantages of a temperature sensor according to the structure according to the invention, in particular with a sensor structure made of Pt, with respect to an NTC sensor are the linear characteristic curve over a wide temperature range, the long-term stability and the high accuracy according to DIN IEC 60751.

A further aspect of the invention relates to a method for producing a temperature sensor according to the invention. With regard to individual method aspects, reference is made to the explanations in connection with the temperature sensor according to the invention. Individual aspects with respect to producing the temperature sensor are already contained within the preceding part of the description.

The method according to the invention for producing a temperature sensor according to the invention comprises the steps of:
 a) providing a substrate formed from a metal element and having a front side and a rear side,
 b) forming at least one insulation layer on the front side of the substrate such that an insulation-layer-free portion of the substrate is formed,
 c) applying a sensor structure, in particular a resistive sensor structure, to the insulation layer and to the insulation-free portion of the front side of the substrate,
 d) applying at least one contact pad.

In step b), the insulation layer is applied to the front side of the substrate, for example, over the entire surface and is removed at least in portions in a further method step such that the insulation-layer-free portion of the substrate is formed. It is possible to remove an insulation layer applied to the front side of the substrate by means of laser ablation and/or lift-off and/or by means of chemical etching and/or by means of plasma etching and/or abrasive removal, for example. In some removal methods, a part of the underlying substrate material can optionally be removed in addition to the removal of the insulation layer, and its thickness can be reduced locally.

The actual formation of the insulation-layer-free portion or the process actually to be applied for producing an insulation-layer-free portion depends, for example, on the composition of the insulation layer and on the method by which the insulation layer is/was applied to the front side of the substrate.

In a further embodiment of the invention, it is possible for the insulation layer to be applied to the front side of the substrate by means of a gas separation method and/or a printing method and/or a dipping method and/or a spraying method, in particular by means of an aerosol deposition method (ADM).

If the insulation layer is already applied in a structured manner, as is possible, for example, by means of a printing method, in particular by means of a screen printing method, no subsequent method step is required for the portion-wise removal of the insulation layer.

The use of shading masks also enables the structured application of the insulation layer on the front side of the substrate.

In step c), for example, a thick film can be applied for example through screen printing to the insulation layer as well as to the insulation-layer-free portion for applying the sensor structure.

In a further embodiment of the invention, in step c) the sensor structure can first be applied by means of PVD methods as a homogeneous metal layer, preferably over the entire surface. The metal layer can subsequently be structured by means of a laser structuring method or photolithographically.

Furthermore, it is possible that a lift-off process is performed to create the structure. For this purpose, a photoresist is applied to the insulation layer and to the insulation-layer-free portion. The photoresist is then dried and exposed and subsequently developed. A conductive layer is subsequently applied to the photoresist structure produced in this way. This is followed by structuring of the conductive layer by dissolving the photoresist structure with the aid of a solvent. In this case, the metallization is removed on the photoresist and the film remaining on the surface in turn corresponds to the negative of the original photoresist structure.

In one embodiment of the invention, the contact pad to be applied in step d) can be applied to the insulation layer. Furthermore, it is possible for the at least one contact pad to be applied at least indirectly to the insulation layer or to be connected at least indirectly to the insulation layer.

In a further embodiment of the method according to the invention, provision is made for a passivation layer to be applied to the sensor structure at least in portions.

A passivation layer is preferably applied to the upper side of the sensor structure over the entire surface. The at least one contact pad is provided at least in portions with a passivation layer. Furthermore, it is possible for the contact pad or the contact pads to be formed completely free of a passivation layer. This makes it possible to electrically contact the contact pads in a correspondingly simple manner.

The method according to the invention for producing a temperature sensor is characterized by a particularly simple methodology and a cost-effective implementation.

In a further embodiment of the method according to the invention, steps a) to d) are carried out on a substrate strip and/or a substrate carrier. In other words, steps a) to d) are carried out in such a way that a plurality of temperature sensors are produced together on a substrate strip and/or a substrate carrier and are subsequently singulated.

The forms of individual substrates are introduced onto the substrate strip and/or the substrate carrier. For this purpose, the substrates are separated from the substrate strip and/or the substrate carrier on the sides. The substrates are not detached or separated from the substrate strip and/or the substrate carrier at corners and/or individual side portions, so that the individual substrates continue to be connected to the substrate strip and/or the substrate plate. In this then present form, the individual substrates can be further processed so that steps b) to d) can be carried out together in common method steps.

Finally, the individual substrates are separated from the substrate strip and/or the substrate carrier.

In a further embodiment of the invention, a first supply line of the temperature sensor is connected to the rear side of the substrate and a second supply line of the temperature sensor is connected to the at least one contact pad, which is preferably formed on the front side.

In the following, according to embodiments 1 to 3 different temperature sensors according to the invention and various methods for producing such temperature sensors are specified.

EMBODIMENT 1

The substrate is formed from a nickel sheet, wherein the substrate has a front side and a rear side. The substrate is gold-plated on both sides and comprises a length of 0.8 mm, a width of 0.8 mm and a height of 100 μm. An insulation layer is applied on the front side of the substrate. This is an aluminum oxide ($Al_2O_3$) layer applied by means of ADM. The layer thickness of the insulation layer is 2 μm. Subsequently, a portion of the insulation layer, i.e. a portion of the $Al_2O_3$ layer, is again removed by means of laser ablation, so that, for example, a strip of 0.1 mm×0.8 mm of the underlying gold-coated substrate, i.e. of the gold-coated nickel metal sheet, is exposed.

Subsequently, a platinum layer is applied to the insulation layer and to the insulation-layer-free portion. This is done by means of PVD methods. A platinum layer having a layer thickness of 200 nm is applied. By laser ablation, a sensor structure is worked out of the platinum layer. In this case, the trench produced by the laser can also be converted into the $Al_2O_3$ layer and/or penetrate into the region of the exposed nickel sheet. The sensor structure consists of a first contacting portion which is formed on the insulation-layer-free portion of the front side of the substrate, a meandering portion, a trimming path and a second contacting portion. The second contacting portion is connected to a contact pad. The meandering portion of the sensor structure is dimensioned as follows:

The distance between the meandering bars is 20 μm. The bar width is 20 μm. The bar length is 500 μm. With a meandering portion length of 3.81 mm, the total resistance of the meandering portion is approximately 100 Ω. The meandering portion covers an area of approximately 0.3 mm×0.5 mm.

The trimming path, which is also worked out of the platinum layer by laser ablation, has a similar dimension. The total area of the sensor structure is 0.5 mm*0.6 mm.

Subsequently, the sensor structure is adjusted to the resistance setpoint value by removing individual segments of the trimming path with a laser.

Then a glass slurry is applied to the entire sensor structure with the exception of the second contacting portion and burnt in.

A first contact pad, which is electrically connected to the second contacting portion, is subsequently applied to the passivation layer.

A first electrical supply line is applied, which is connected to the rear side of the substrate. Preferably, the first electrical supply line is connected to the underside by means of soldering. The second electrical supply line is made available in the form of a gold-bonding wire. This gold wire is connected to the first contact pad.

EMBODIMENT 2

The substrate is formed from a copper sheet. On the front side of the copper sheet, an $Al_2O_3$ insulation layer is applied. The $Al_2O_3$ layer is deposited by means of ADM. The thickness of the insulation layer is 20 μm.

Subsequently, the copper sheet is aged in an oven at 500° C. for one hour under air supply. Under the $Al_2O_3$ insulation layer, after aging, no additional copper oxidation is observed.

EMBODIMENT 3

In contrast to embodiment 2, a glass slurry layer is applied to the cleaned copper sheet and burnt in. The layer thickness is approximately 20 μm. Subsequently, the copper sheet is aged in an oven at 500° C. for one hour under air supply.

In the case of the same aging conditions as those also used in embodiment 2, circular oxidation surfaces on the copper film in the covered region are formed in embodiment 3. Such circular oxidation surfaces indicate pinholes in the glass cover.

In a comparison of embodiments 2 and 3, the improved insulation properties of an insulation layer produced by means of ADM are thus visible with respect to a glass slurry layer.

EMBODIMENT 4

The substrate is formed from a nickel sheet, wherein the substrate has a front side and a rear side. These two sides are simultaneously applied over the entire surface by dip coatings in the chemical solution deposition method, with lanthanum zirconate layers ($La_2Zr_2O_7$) in each case of thickness 200 nm. To protect the substrate from unwanted oxidation during heat treatment, this step is carried out under forming gas atmosphere.

In the chemical solution deposition method, the rear side is inevitably coated, provided that specific countermeasures are not taken in order to prevent such a coating. In this case, the positive side effect is that the rear side is likewise covered with the same insulation layer and the substrate can be protected from unintentional oxidation in the further metallization steps. Accordingly, three metallization steps are followed by platinum and two further deposition steps of an aluminum oxide layer ($Al_2O_3$) applied by screen printing to form a three-dimensional structure with a total resistance of about 300 ohms.

In the first platinum metallization step, 0.25 $mm^2$-large contact pad and a meandering structure with a bar width of 20 μm and a bar length of 3.81 mm and 200 nm layer thickness are applied on the lanthanum zirconate layer, so that a sufficiently large area for the later contacting of the region still to be exposed remains unused. In addition, the meandering portion is to be designed such that approximately the last 0.4 mm of the meandering portion length comes to lie in the vicinity of the contact pad already deposited. A laser ablation method is used for structuring the meandering portion.

In the second deposition step of the insulation layer, 90% of the meandering structure is covered with a further insulation layer consisting of aluminum oxide deposited by screen printing. In this case, at least the contact pad already attached is spared from the coating.

In the deposition step of the platinum layer structure, starting on the conductor track end not covered with aluminum oxide, a further meandering structure with a length of 3.81 mm and width of 20 μm is predominantly printed on the second insulation layer. The first and the second meandering structure touch each other in the region that is not covered by the second insulation layer.

In the third deposition step of an insulation layer, 90% of the second platinum layer structure of the second deposition step are again covered.

At least on a substrate region not covered with platinum, all covering insulation layers are removed by means of laser ablation in order to expose the underlying metal substrate. The future electrical contact region to the substrate has a length of 0.5 mm and a width of 20 μm. This corresponds to an area of only 0.01 $mm^2$.

In the third deposition of the meandering platinum structure, the latter contacts the second platinum structure with its first end region. With its second end region, the metal substrate exposed by laser ablation is contacted.

In the last working step, a 0.30 mm²-large area is formed on the rear side of the substrate from the lanthanum zirconate layer as a contact pad to the nickel substrate exposed by laser ablation.

Thereafter, the substrate front side, including the 0.01 mm²-small contact area with respect to the nickel substrate, but excluding the platinum contact pad deposited first, can optionally be coated with a passivation layer.

The electrical contacting of the entire three-dimensional meandering portion takes place via the platinum contact pad deposited in the first metallization step and the metallic nickel region exposed on the substrate rear side.

A person skilled in the art recognizes that the dimensions indicated in connection with the embodiment 4 are exemplary values. The three-dimensional structure set forth in embodiment 4 can also be produced with other materials and/or with other dimensions.

The invention is explained in more detail below using exemplary embodiments with reference to the accompanying drawings.

In the drawings:

FIG. 1a-1d show different views and production intermediate products of a first temperature sensor according to the invention;

Figure 1C:
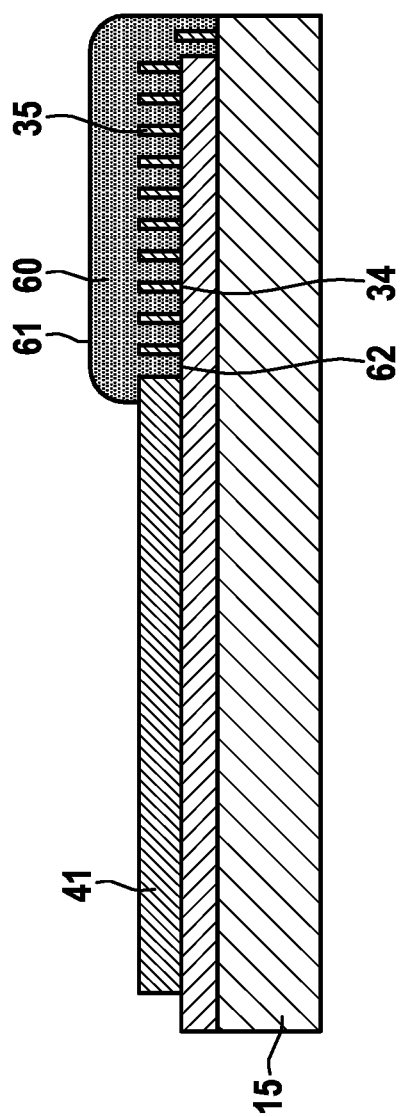

In the following, the same reference signs are used for identical and identically acting components.

FIG. 1a shows a plan view of an intermediate stage of a temperature sensor 10 to be produced. An insulation layer 20 is applied to the front side 16 on a substrate 15, which substrate is formed, for example, from a metal foil.

As shown in the side view of FIG. 1b, the insulation layer 20 does not completely cover the front side 16 of the substrate 15. Instead, an insulation-layer-free portion 25 is formed. The insulation-layer-free portion 25 is formed on an edge portion 18 of the front side 16 of the substrate 15.

A portion of the front side 16 of the substrate 15 which adjoins at least one of the illustrated side edges 19 or 19' of the substrate 15 is to be understood as the edge portion 18. The side edges 19 are the long side edges of the substrate 15. In contrast, the side edges 19' are the short side edges of the rectangular substrate 15.

The insulation-layer-free portion 25 is produced, for example, by the insulation layer 20 already being structured, i.e. being applied to the front face 16 of the substrate 15 in the final shape to be achieved. In a further embodiment of the invention, it is possible to first coat the complete front side 16 with an insulation layer 20 and to subsequently produce the insulation-layer-free portion by removing a corresponding insulation layer portion.

Furthermore, a sensor structure 30 can be seen. The sensor structure 30 has a meandering portion 36. The sensor structure 30 further comprises a first contacting portion 31 and a second contacting portion 32. The first contacting portion 31 is connected to the insulation-layer-free portion 25 of the front face 16 of the substrate 15. By contrast, the second contacting portion 32 is connected to the first contact pad 41. The contact pad 41 is in turn arranged on the insulation layer 20.

The sensor structure 30 is arranged with a first side 34 on the first side 21 of the insulation layer 20 and on the front side 16 of the substrate 15. The insulation layer 20 is in turn arranged with the second side 22 directly on the substrate 15 or on the front side 16 of the substrate 15.

As can be seen from FIG. 1c, the second side 35 of the sensor structure 30 or the side 35 of the sensor structure 30 which faces away from the substrate 15 can be coated with a passivation layer 60. This relates both to the part of the sensor structure 30 which comprises the first contacting portion 31 and to the portion of the sensor structure 30 which has the second contacting portion 32. The first contact pad 41 is also coated at least in portions by the passivation layer 60.

The passivation layer 60 in turn has substantially a first side 61 and a second side 62. The first side 61 of the passivation layer 60 is the side facing away from the sensor structure 30. The second side 62 of the passivation layer is the side of the passivation layer which, among other things, rests on the insulation-layer-free portion 25 and on the insulation layer 20.

Figure 1D:
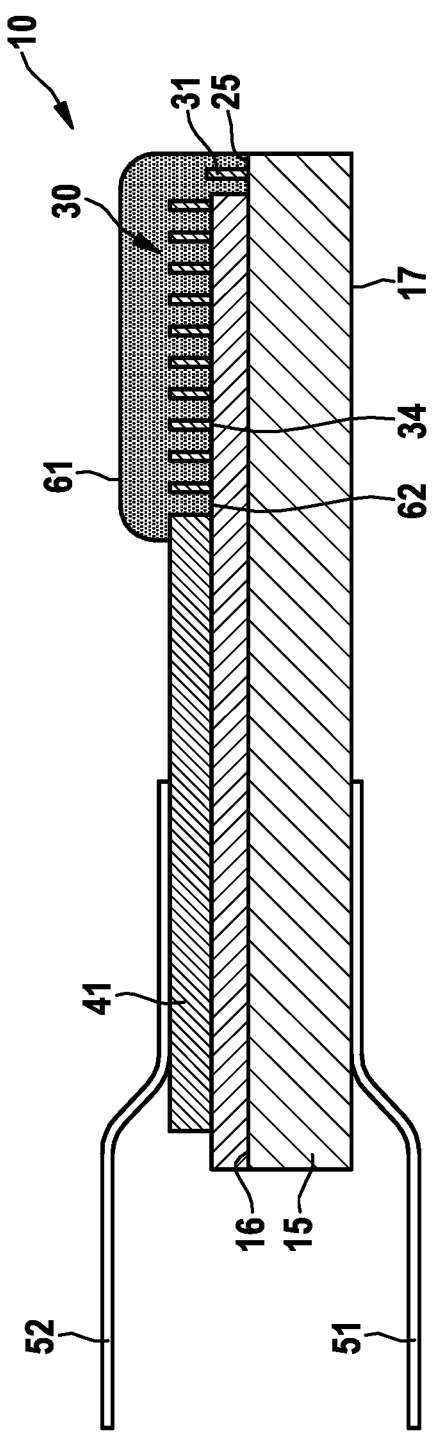

FIG. 1d shows the supply lines 51 and 52 of the temperature sensor 10.

Accordingly, the temperature sensor 10 has a first electrical supply line 51, which is connected to the rear side 17 of the substrate 15. A second electrical supply line 52 is connected to the first contact pad 41.

The electrical contacting of the temperature sensor 10 therefore takes place on the one hand via the first contact pad 41 and on the other hand via the rear side 17 of the substrate 15. Contacting of the rear side 17 of the substrate 15 is possible in that the sensor structure 30 in the first contacting portion 31 is electrically connected to the front side 16 of the substrate 15 in the insulation-layer-free portion 25.

The sensor structure 30 is preferably a platinum structure. This sensor structure 30 serves for temperature detection. A temperature sensor 10, as shown in FIG. 1a to 1d, has a high degree of accuracy, among other things, due to a platinum sensor structure. The small dimensions of the temperature sensor 10 can be realized in that the electrical contactings of the temperature sensor 10 take place on the opposite sides of the temperature sensor, i.e. on the rear side 17 of the substrate 15 and on the side of the contact pad 41.

It is possible for the temperature sensor 10, as shown in FIG. 1d, to be immersed and fired together with the supply lines 51, 52 into a glass slurry, so that the temperature sensor 10 is completely encapsulated.

The area A of the temperature sensor 10 is preferably less than 10 mm², particularly preferably less than 1 mm². The surface A of the temperature sensor 10 is formed on the basis of the long side edge 19 and the short side edge 19' of the substrate 15 (see FIG. 1a).

Figure 2A:
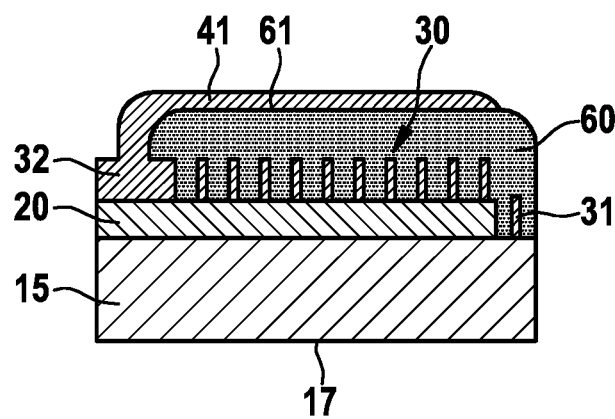
FIGS. 2a and 2b show a further temperature sensor according to the invention.
Figure 2B:
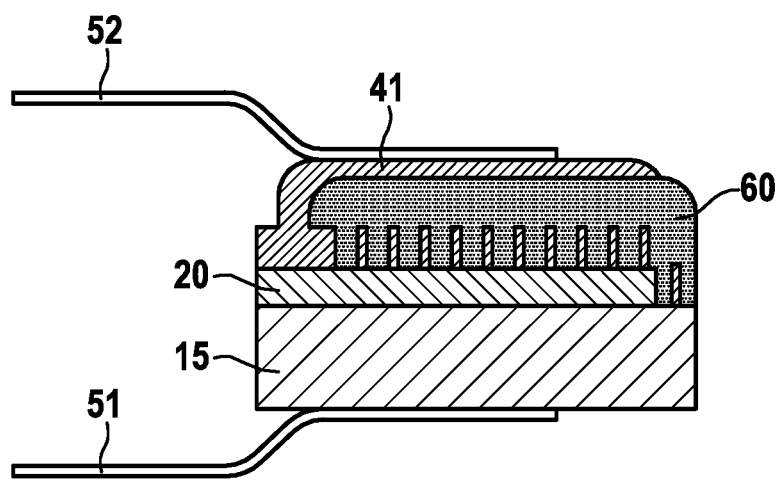

FIGS. 2a and 2b show a further embodiment of a temperature sensor 10 according to the invention. Such an embodiment allows a further reduction of the sensor surface. The structure substantially corresponds to the structure of FIGS. 1a to 1d.

In contrast to the embodiment according to FIG. 1a to 1d, the first contact pad 41 is arranged such that this contact pad 41 at least partially rests on the side 61 of the passivation layer 60 facing away from the sensor structure 30 and at the same time is electrically connected to the second contacting portion 32, which is not covered with the passivation layer 60. Due to such an arrangement, the space of the substrate 15 is additionally saved, which is accompanied by the extension of the first contact pad 41 in FIG. 1a. With the embodiment shown in FIG. 2a, the area of the temperature sensor is further reduced.

In FIG. 2b, the supply lines 51 and 52 are again shown. The first supply line 51 is in turn connected to the rear side 17 of the substrate 15. The second electrical supply line 52 is connected to the first contact pad 41.

Figure 3:
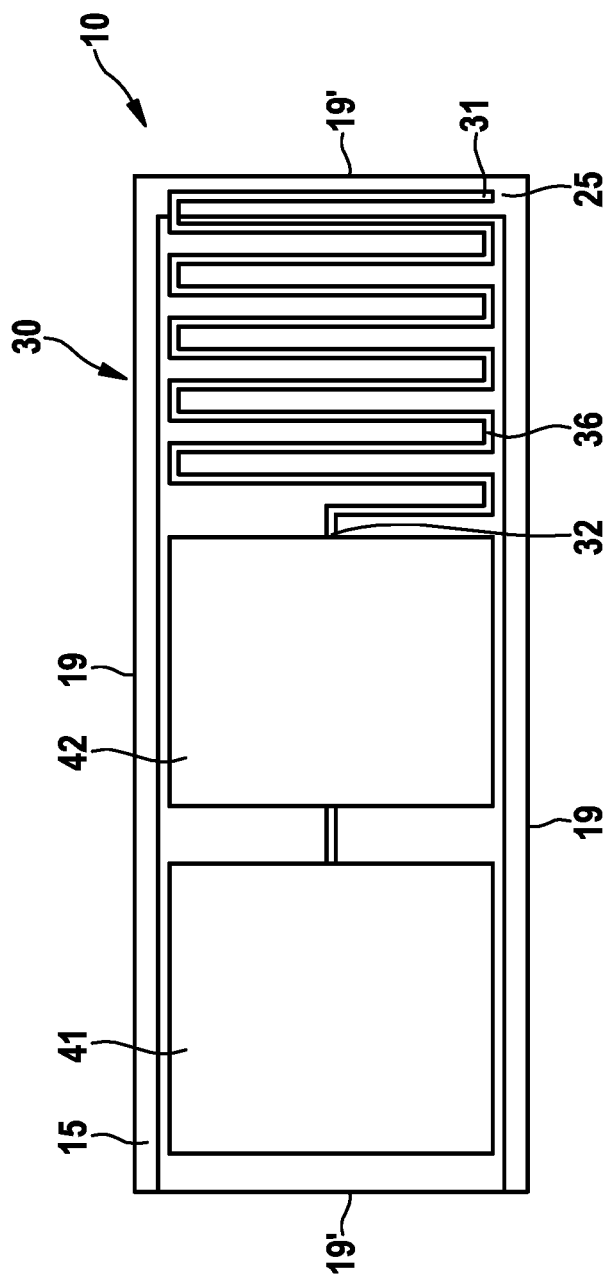
FIG. 3 shows a third embodiment of a temperature sensor according to the invention.

FIG. 3 shows a further embodiment with respect to a temperature sensor 10. The structure substantially corresponds to the structure of a temperature sensor shown in FIG. 1a.

In addition, a second contact pad 42 is formed. The sensor structure 30 or the second contacting portion 32 of the sensor structure is indirectly connected to the first contact pad 41. The second contact pad 42 and the first contact pad 41 are connected to one another. The second contact pad 42 can be used as a center tap for a resistor network in order, for example, to tap off a potential in a currentless manner.

LIST OF REFERENCE SIGNS

10 Temperature sensor
15 Substrate
16 Front side of substrate
17 Rear side of substrate
18 Edge portion
19, 19' Side edge
20 Insulation layer
21 First side of insulation layer
22 Second side of insulation layer
25 Insulation-layer-free portion
30 Sensor structure
31 First contacting portion
32 Second contacting portion
34 First side of sensor structure
35 Second side of sensor structure
36 Meandering portion
41 First contact pad
42 Second contact pad
51 First electrical supply line
52 Second electrical supply line
60 Passivation layer
61 First side of passivation layer
62 Second side of passivation layer
A Temperature sensor area

The invention claimed is:

1. A temperature sensor comprising:
an electrically conductive substrate formed from a metal foil, wherein the substrate comprises a front side and a rear side,
an insulation layer that covers the front side of the substrate only in portions such that an insulation-layer-free portion is formed on the front side of the substrate, and
a resistive sensor structure that is formed on the insulation layer and on the insulation-layer-free portion of the front side of the substrate,
wherein the sensor structure comprises at least two electrical contacting portions, and a first contacting portion is connected to the insulation-layer-free portion of the front side of the substrate, and a second contacting portion is a first contact pad or is connected to a first contact pad, wherein the first contact pad is arranged on the insulation layer, and
wherein the temperature sensor is configured as a single piece, and the first and at least second contacting portions are each configured as a section of the single-piece temperature sensor.

2. The temperature sensor according to claim 1, wherein
the insulation-layer-free portion is formed on an edge portion of the front side of the substrate.

3. The temperature sensor according to claim 1, wherein
the temperature sensor comprises a first electrical supply line which is connected to the rear side of the substrate and comprises at least one second electrical supply line which is connected to the first contact pad.

4. The temperature sensor according to claim 1, wherein
a passivation layer is formed at least in portions on the side of the sensor structure facing away from the substrate.

5. The temperature sensor according to claim 4, wherein
the first contact pad is arranged, in particular bent, in such a way that it rests in portions on the side of the passivation layer facing away from the sensor structure.

6. The temperature sensor according to claim 1, wherein the metal foil, is formed from aluminum (Al) and/or steel, ferritic steel, and/or titanium (Ti) and/or niobium (Nb) and/or tantalum (Ta) and/or nickel (Ni) and/or copper (Cu).

7. The temperature sensor according to claim 1, wherein
the insulation layer comprises aluminum oxide ($Al_2O_3$) and/or aluminum titanate ($Al_2TiO_5$) and/or titanium dioxide ($TiO_2$) and/or silicon dioxide ($SiO_2$) and/or silicon oxide (SiO) and/or magnesium oxide (MgO) and/or magnesium titanate ($MgTiO_3$) and/or a binary zirconium dioxide alloy and/or a ternary zirconium dioxide alloy and/or boron nitride (BN) and/or aluminum nitride (AlN) and/or silicon nitride ($Si_3N_4$).

8. The temperature sensor according to claim 1, wherein
the insulation layer (20)
is a metal oxide layer, in particular an anodized metal oxide layer or a metal nitride layer or a metal oxynitride layer, or
is formed from a layer composite, or
comprises a glass-like or glass-ceramic layer formed from a slurry or a paste with metal oxides contained therein, in particular aluminum oxide particles ($Al_2O_3$) and/or magnesium oxide particles (MgO), or
is formed from a layer composite, wherein at least one layer has a polymer layer.

9. The temperature sensor according to claim 1, wherein
a second contact pad, which is in particular formed on the insulation layer (20), wherein the second contact pad is electronically connected to the first contact pad, wherein the second contact pad preferably forms a further tap of a resistor network.

10. The temperature sensor according to claim 1, wherein
the area (A) of the temperature sensor is less than 10 $mm^2$, preferably less than 3 $mm^2$, more preferably less than 2 $mm^2$, most preferably less than 1 $mm^2$.

11. A method for producing a temperature sensor according to claim 1, wherein
a) providing a substrate formed from a metal element and having a front side and a rear side,
b) forming at least one insulation layer on the front side of the substrate such that an insulation-layer-free portion of the substrate is formed,
c) applying a sensor structure, in particular a resistive sensor structure, to the insulation layer and to the insulation-free portion of the front side of the substrate,
d) applying at least one contact pad.

12. The method according to claim 11, wherein in step b), the insulation layer is applied over the entire surface to the front side of the substrate and is removed at least in portions in a further method step such that the insulation-layer-free portion of the substrate is formed.

13. The method according to claim 11, wherein
in step b), the insulation layer is applied by means of a gas separation method, a printing method, a dipping method or a spraying method, in particular by means of an aerosol deposition method (ADM).

14. The method according to claim 11, wherein
steps a)-d) are carried out in such a way that a plurality of temperature sensors are produced together on a substrate strip and/or a substrate carrier and are subsequently singulated.

15. The method according to claim 11, wherein
a first supply line is connected to the rear side of the substrate and a second supply line is connected to the at least one contact pad.

\* \* \* \* \*